United States Patent [19]
Modic

[11] Patent Number: 5,969,034
[45] Date of Patent: Oct. 19, 1999

[54] BLOCK COPOLYMERS WITH IMPROVED OVERMOLDING ADHESION

[75] Inventor: Michael John Modic, Houston, Tex.

[73] Assignee: Shell Oil Company, Houston, Tex.

[21] Appl. No.: 08/721,644

[22] Filed: Sep. 26, 1996

[51] Int. Cl.⁶ .................................................... C08J 29/04
[52] U.S. Cl. ........................................................... 524/504
[58] Field of Search ............................................. 524/504

[56] References Cited

U.S. PATENT DOCUMENTS

| | | | |
|---|---|---|---|
| H1022 | 2/1992 | Holden et al. | 524/474 |
| Re. 32,217 | 7/1986 | Andersen | 525/53 |
| T962,011 | 9/1977 | Muehlner | 428/517 |
| 4,391,863 | 7/1983 | Bonis | 428/35 |
| 4,397,987 | 8/1983 | Cornell | 525/75 |
| 4,444,840 | 4/1984 | Wefer | 428/339 |
| 4,476,283 | 10/1984 | Andersen | 525/53 |
| 4,493,921 | 1/1985 | Wefer | 525/67 |
| 4,550,138 | 10/1985 | Paddock et al. | 525/67 |
| 4,576,860 | 3/1986 | Fink et al. | 428/314.4 |
| 4,665,125 | 5/1987 | Kishida et al. | 525/67 |
| 4,780,506 | 10/1988 | Wefer | 525/67 |
| 4,814,381 | 3/1989 | Wefer | 525/67 |
| 4,895,899 | 1/1990 | Wefer | 525/67 |
| 5,356,705 | 10/1994 | Kelch et al. | 428/332 |

FOREIGN PATENT DOCUMENTS

| | | |
|---|---|---|
| 0 048 388 A1 | 3/1982 | European Pat. Off. . |
| 0096301 A2 | 12/1983 | European Pat. Off. ........ C08L 69/00 |
| 0107303 | 5/1984 | European Pat. Off. ........ C08L 69/00 |
| 0203425 | 12/1986 | European Pat. Off. ........... C09J 3/14 |
| 0230609 | 8/1987 | European Pat. Off. ........ C08L 69/00 |
| 0 791 631 A1 | 2/1996 | European Pat. Off. . |
| 2 288 177 | 10/1995 | United Kingdom . |

*Primary Examiner*—Peter D. Mulcahy
*Attorney, Agent, or Firm*—Beverlee G. Steinberg

[57] ABSTRACT

A thermoplastic elastomer composition is provided. The composition comprises a hydrogenated elastomeric block copolymer having at least two resinous endblocks of polymerized monovinyl aromatic compound and an elastomeric midblock of polymerized conjugated diene, a midblock plasticizer, and an ethylene-propylene-diene monomer rubber grafted with styrene-acrylonitrile. The thermoplastic elastomer exhibits improved overmolding adhesion to polar matrices over compositions not containing the monomer rubber.

24 Claims, No Drawings

BLOCK COPOLYMERS WITH IMPROVED OVERMOLDING ADHESION

This invention relates to elastomers with good overmolding adhesion. In particular, this invention relates to elastomeric block copolymers with good adhesion to polar substrates such as polycarbonate or acrylonitrile-butadiene-styrene (ABS).

Although elastomeric block copolymers are known to be compatible with polyolefins, their use on polar matrices/substrates, such as polycarbonate or ABS, has been limited due to poor compatibility between the block copolymer and the substrate. In particular, it is desirable in many instances to mold a soft rubber material directly onto a hard substrate, thus providing a soft cover. However, the use of many attractive soft, rubbery elastomers is limited due to incompatibility between the elastomer and the substrate. The rubber coating will not adhere well to the substrate and sloughs off with use. It would be desirable to have a soft, rubbery elastomeric copolymer that will adhere to hard substrates such as polycarbonates and ABS.

SUMMARY OF THE INVENTION

It is an object of this invention to provide a soft, rubbery elastomeric block copolymer composition which adheres well to hard substrates such as polycarbonate and ABS.

In accordance with this invention a composition is provided for a thermoplastic elastomer which comprises a hydrogenated elastomeric block copolymer having at least two resinous endblocks of polymerized monovinyl aromatic compound and an elastomeric midblock of polymerized conjugated diene, midblock plasticizer, and an ethylene-propylene-diene monomer rubber (EPDM) grafted with styrene-acrylonitrile (SAN).

DETAILED DESCRIPTION OF THE INVENTION

Applicants have found that the combination of an ethylene-propylene-diene monomer rubber (EPDM) which has been grafted with styrene-acrylonitrile (SAN) and a hydrogenated elastomeric block copolymer yields a thermoplastic elastomer composition with improved adhesion characteristics.

The elastomeric block copolymers suitable for use herein are known in the art, as disclosed for instance in Stevens et al. U.S. Pat. No. 5,194,530 (Mar. 16, 1993), the disclosure of which is hereby incorporated by reference. The elastomeric block copolymers have at least two resinous endblocks of polymerized monovinyl aromatic compound, thus giving a resinous segment, and an elastomeric midblock of polymerized conjugated diene, thus giving an elastomeric segment. The copolymers can be linear, A—B—A, or radial. It is also possible to use a mixture of block copolymers, such as a combination of a high molecular weight copolymer and a medium molecular weight copolymer.

Suitable monovinyl aromatic compounds are those having 8 to 20 carbon atoms as exemplified by styrene and styrene homologs such as alpha-methylstyrene and para-methylstyrene. Styrene is especially preferred. Suitable conjugated dienes include those having 4 to 8 carbon atoms. Illustrative of such conjugated dienes are 1,3-butadiene (butadiene), 2-methyl-1,3-butadiene (isoprene), 1-3-pentadiene (piperylene), 1,3-octadiene, and 2-methyl-1,3-pentadiene. Preferred conjugated dienes are butadiene and isoprene, most preferably butadiene.

The molecular weight of the copolymer will generally be at least 50,000. For linear A—B—A polymers, the molecular weight will generally be within the range of 50,000 to 300,000. Actually, the upper limit is dictated by viscosity considerations and can be as high as can be tolerated and still be processable. The most preferred molecular weight for linear A—B—A copolymers is 50,000 to 185,000. With radial polymers, the molecular weight can be much higher since these polymers have a lower viscosity for a given total molecular weight. Thus, for radial polymers the molecular weight generally will be in the range of 50,000 to 1 million, preferably 100,000 to 500,000.

When used herein in reference to linear or A—B—A copolymers, the term "molecular weight" is the molecular weight as measured by gel permeation chromatography (GPC) where the GPC system has been appropriately calibrated with polystyrene standards. The polymer in anionically polymerized linear polymers is essentially monodispersed and it is both convenient and adequately descriptive to report the peak molecular weight of the narrow molecular weight distribution observed. Such methods are well known and described in patents including U.S. Pat. No. 5,229,464, the disclosure of which is hereby incorporated by reference. Since styrene (as polystyrene) is used as the calibration standard, the measurement directly gives the absolute molecular weight of the styrene endblocks. Knowing the molecular weight and percentage of styrene present, the absolute molecular weight of the midblock segment can be calculated. The molecular weight is measured on an aliquot which is removed after the first step of the polymerization and then terminated to deactivate the initiator.

It is not as straightforward to measure the true molecular weight of a final coupled star or radial copolymer by using GPC. The star-shaped molecules do not separate and pass through the packed GPC columns in the same manner as do the linear polymers used for the calibration. Hence, the time of arrival at a UV or refractive index detector is not a good indicator of the molecular weight. Therefore, instead of GPC, light scattering techniques are used to measure the weight average molecular weight of a star copolymer. The sample is dissolved in a suitable solvent to a concentration of less than 1 gram of sample per 100 milliliters of solvent and then filtered directly into the light scattering cell using a syringe and porous membrane filters of less than 0.5 micron pore size. The light scattering measurements are performed as a function of scattering angle and of polymer concentration using standard procedures. The differential refractive index (DRI) of the sample is measured at the same wave length and in the same solvent used for the light scattering. This results in a molecular weight value which approximates the weight average molecular weight of the radial copolymer.

The elastomeric block copolymers utilized in this invention are hydrogenated to such a degree that the unsaturation of the elastomeric block is greatly reduced without significant change in unsaturation of the resinous block component. Generally, at least 90 percent of the unsaturation in the diene midblock is hydrogenated and no more than 25 percent, preferably less than 10 percent, of the aromatic unsaturation is hydrogenated. Such hydrogenation techniques are known in the art and disclosed, for instance, in Jones U.S. Pat. No. Reissue 27,145 (Jun. 22, 1971), the disclosure of which is hereby incorporated by reference. Since the block copolymers utilized in this invention are hydrogenated to remove the aliphatic unsaturation, they can be viewed as S-EB-S polymers, where the S refers to the monovinyl aromatic, generally styrene, endblocks and the EB represents ethylene/butylene, which is the structure resulting from the hydrogenation of polymerized 1,3-butadiene.

The composition of this invention contains in addition a SAN-grafted EPDM which is compatible both with the elastomeric block copolymer and a hard substrate such as polycarbonate or ABS. Examples of SAN grafted-EPDM which have been found to work well in the compositions of the invention are ROYALTUF® 372P20 and ROYALTUF® 372C (Uniroyal). ROYALTUF® 372P2C is an ethylene/propylene/non-conjugated diene (EPDM) elastomer grafted with SAN resin. The EPDM is present as a finely dispersed phase in the continuous SAN, although intense processing in a twin screw extruder can lead to phase inversion. ROYALTUF® 372P20 is approximately 50/50 SAN/EPDM, with a specific gravity of 0.98 and a melt index of 20 g/10 min. at 265° C., 21600 g load. ROYALTUF® 372C is similar to ROYALTUF® 372P20 except it is raw crumb from the reactor. The SAN is present as a dispersed phase in the continuous EPDM. ROYALTUF® 372C has a melt index of less than 0.01 g/10 min. at 265° C., 21600 g load. ROYALTUF® 372P20 is preferred due to ease of mixing and degree of dispersion in compounds.

A midblock plasticizer is included in the composition of the invention. The plasticizer used is an oil which is compatible with the elastomeric mid-block segment of the elastomeric block copolymer and which does not tend to go into the aromatic endblock portions to any significant degree. Thus, the oils can be viewed as paraffinic. Paraffinic oils which may be used in the elastomeric composition should be capable of being melt processed with other components of the elastomeric composition without degrading. Particularly important is the ability of the final composition to be melt extruded. An excellent oil is a white mineral oil available sold as DRAKEOL 34, available from the Pennreco Division of the Pennzoil Company. DRAKEOL 34 has a specific gravity of 0.864–0.878 at 51° C., a flashpoint of 238° C., and a viscosity of 370–420 SUS at 38° C. Suitable vegetable oils and animal oils or their derivatives may also be used as the plasticizer. Other suitable oils include hydrogenated materials, i.e. hydrogenated naphthenics. Materials which are initially aromatic in nature should be hydrogenated to the point where they exhibit no significant levels of aromatic unsaturation or at most, very low levels.

An olefinic polymer compatible with the midblock, endblocks, or both may also be added. Polypropylene has been seen to work well in additions of 3 to 15 percent.

A flow promoter may also be added. A flow promoter provides better "wet-out" of the thermoplastic elastomer and thus, better contact between the elastomer and the substrate, leading to improved adhesion. An example of a flow promoter which has produced good results is KRISTALEX® 1120 (Hercules). KRISTALEX® 1120 is a water-white, low-molecular-weight, thermoplastic hydrocarbon resin derived largely from α-methylstyrene. KRISTALEX® 1120 has a specific gravity of 1.07 at 25/25° C., a flashpoint of 236° C., and a viscosity of 50 stokes at 25° C. Flow promoter additions of 3 to 10 weight percent have provided good results.

Thus, the composition of this invention comprises the hydrogenated elastomeric block copolymer, the SAN-grafted EPDM, and the oil. A preferred mix is 25 to 45 weight percent, preferably 35 to 45 weight percent block copolymer, 35 to 45 weight percent oil, and 5 to 20 weight percent, preferably 6–18 weight percent SAN-grafted EPDM, all percentages based upon the total weight of the combined additives. Polypropylene may be added at 3 to 15 weight percent, preferably 5 to 10 weight percent. A flow promoter such as KRISTALEX® 1120 may also be added, preferably at 3 to 10 weight percent.

Generally, no crosslinking agents are used in the composition. This, of course, does not exclude the presence of materials such as stabilizers which are used for the normal purpose of stabilization. Suitable stabilizers are disclosed in St. Clair, U.S. Pat. No. 4,835,200 (May 30, 1989), the disclosure of which is hereby incorporated by reference. Particularly preferred are hindered phenols, particularly less volatile hindered phenols such as tetrakis[methylene(3,5-di-tert-butyl-4-hydrooxyhydrocinnamate)]methane sold by Ciba Geigy under the tradename IRGANOX® 1010 alone or in combination with a thiosynergist such as DLTDP (dilaurylthiodipropionate).

The invention is particularly useful for direct overmolding onto polar matrix/substrate materials such as polycarbonate or ABS. Potential uses include, without limitation, automotive instrument panels, knobs, buttons, pen/pencil grips, cellular phones, toothbrushes, handles, and tool grips. The composition may also be co-extruded, co-extrusion blowmolded, double-injection molded, insert molded, or sandwich molded. It is believed that overmolding onto a warm substrate and/or aging are helpful in improving adhesion.

The invention is further illustrated with the following examples

EXAMPLES

Sixteen test compositions having varying amounts of block copolymer, oil, SAN-grafted EPDM, polypropylene, and flow promoter were prepared. First the block copolymer (in crumb form) and oil were mixed together either by hand or with a mixer. Once the oil was absorbed by the crumb, the remaining ingredients were added and the entire mixture was tumble-mixed. The mixture was then added to an extrusion hopper and feed to a co-rotating, intermeshing twin screw extruder. The mixture was extruded at 300 rpm and a melt temperature of 230° C. to 240° C. The extrudate was formed into pellets by strand cutting.

The injection molding machine used to make overmolding adhesion specimens was equipped with an insert mold which had the ability to mold two different thickness plaques. First, the desired substrate material (e.g., polycarbonate, ABS) was molded into 0.32 cm (0.125 inch) thick plaques. The insert mold was then modified to allow molding of a thicker plaque. A strip of masking tape was laid across one end of the premolded plaque parallel to the molding direction. The premolded substrate plaque was then placed back into the insert mold and the run composition was injected into the mold cavity, forming an approximately 0.25 cm (0.100 inch) thick covering over the substrate material.

The overmolded plaque was then cut perpendicular to the direction of flow into 2.54 cm (1 inch) wide strips for a 90° peel adhesion test. The area where the masking tape was placed on the plaque acted as a site for gripping the compound portion of the overmolded plaque during testing.

Testing was conducted per ASTM D-903 with modifications made for specimen size (1"×6" as opposed to 1"×8") and test speed (2 inches/minute). Tests were conducted on an INSTRON® testing machine at ambient temperature (approximately 75° F.–78° F.). The initial peel (pli) and average peel (pli) were measured. The initial peel was measured at the point where the curve on the adhesion test curve suddenly changed slope due to the beginning of the peel. The average peel was the average of the substantially horizontal slope during the majority of the peel.

Example 1

A first set of test runs were conducted on compositions having the same copolymer with varied additions of SAN-grafted EPDM and polypropylene. The test run compositions and results of the adhesion tests are given in Table 1.

It can be seen that a variety of hydrogenated styrene-butadiene copolymers and mixtures of block copolymers can

TABLE 1[1]

| | | | | SAN-Grafted EPDM | | | |
|---|---|---|---|---|---|---|---|
| Comp | Copolymer[2] (wt %) | Oil[3] (wt %) | Polypropylene (wt %) | EPDM Dispersed[4] (wt %) | SAN Dispersed[5] (wt %) | Adhesion to ABS initial/average (pli)[6] | Adhesion to PC[7] initial/average (pli) |
| 1 | 42.5 | 42.5 | 15 | — | — | 0.1/0.1 | 0.1/0.1 |
| 2 | 42.5 | 42.5 | 7.5 | 7.5 | — | 0.2/0.3 | 0.7/0.9 |
| 3 | 42.5 | 42.5 | — | 15 | — | 4.9/NF | 3.3/2.5 |
| 4 | 35 | 42.5 | 7.5 | 15 | — | 1.0/1.0 | 3.6/3.9 |
| 5 | 42.5 | 42.5 | 7.5 | — | 7.5 | 0.8/0.7 | 1.1/1.2 |
| 6 | 42.5 | 42.5 | — | — | 15 | 3.4/3.5 | 3.2/3.6 |
| 7 | 35 | 42.5 | 7.5 | — | 15 | 1.4/1.4 | 3.8/3.9 |
| 8 | 42.5 | 42.5 | — | — | 15 | 3.4/3.5 | 3.2/3.6 |
| 9 | 37.5 | 37.5 | — | — | 25 | 2.3/3.6 | 1.8/2.9 |

[1]A stabilizer was also present for all test run compositions
[2]KRATON ® G1651 (Shell), a S-EB-S block copolymer with a molecular weight of about 181,000
[3]DRAKOL ® 34 (Pennzoil), a white mineral oil with a specific gravity of 0.864–0.878 at 51° C. and a viscosity of 370–420 SUS at 38° C.
[4]ROYALTUF ® 372C (Uniroyal), a SAN-grafted EPDM with a melt index of <0.01 g/10 min. at 265° C., 21600 g load
[5]ROYALTUF ® 372P20 (Uniroyal), a SAN-grafted EPDM with a melt index of 20 g/10 min. at 265° C., 21600 g load
[6]pli = pounds per linear inch
[7]PC = polycarbonate It can be seen that significantly improved adhesion is obtained with the addition of a SAN-grafted EPDM (Compositions 2–9). It can also be seen that as the level of SAN-grafted EPDM is increased beyond 15 wt %, no further significant improvement in adhesion to either ABS or polycarbonate is achieved (Compositions 6, 8 and 9).

Example 2

A second set of tests were conducted on compositions having varied types of copolymer, including mixtures of two copolymers. The test run compositions and results of the adhesion tests are given in Table 2.

be used to produce compounds that show good adhesion to ABS and polycarbonate.

Example 3

A third set of test runs were conducted on compositions which included a flow promoter. The test run compositions and results of the adhesion tests are given in Table 3.

TABLE 2

| Comp | Low MW Block Copolymer (wt %) | High MW Block Copolymer (wt %) | Oil[1] (wt %) | SAN-Grafted EPDM[2] (wt %) | Adhesion to ABS initial/average (pli)[3] | Adhesion to Polycarbonate initial/average (pli) |
|---|---|---|---|---|---|---|
| 8 | — | 42.5[4] | 42.5 | 15 | 3.4/3.6 | 3.2/3.6 |
| 10 | 17[5] | 42.5[4] | 42.5 | 15 | 0.8/1.3 | 2.5/2.8 |
| 11 | 17[6] | 42.5[4] | 42.5 | 15 | 2.0/2.6 | 3.9/3.8 |
| 12 | — | 42.5[7] | 42.5 | 15 | 1.7/2.4 | 2.8/2.7 |
| 13 | 61.4[8] | — | 23.6 | 15 | 2.5/2.6 | 4.5/5.5 |

[1]DRAKOL ® 34 (Pennzoil), a white mineral oil with a specific gravity of 0.864–0.878 at 51° C. and a viscosity of 370–420 SUS at 38° C.
[2]ROYALTUF ® 372P20 (Uniroyal), a SAN-grafted EPDM with a melt index of 20 g/10 min. at 265° C., 21600 g load,
[3]pli = pounds per linear inch
[4]KRATON ® G1651 (Shell), a S-EB-S block copolymer with a molecular weight of about 181,000
[5]KRATON ® G1652 (Shell), a S-EB-S block copolymer with a molecular weight of about 50,000
[6]KRATON ® FG1901X (Shell), a maleated S-EB-S block copolymer (1.7% maleic anhydride) with a molecular weight of about 50,000
[7]KRATON ® G1654 (Shell), a S-EB-S block copolymer with a molecular weight of about 130,000
[8]KRATON ® G1650 (Shell), a S-EB-S block copolymer with a molecular weight of about 67,000

TABLE 3

| Comp | Low MW Block Copolymer[1] (wt %) | High MW Block Copolymer[2] (wt %) | Oil[3] (wt %) | Styrenic Resin[4] (wt %) | SAN-Grafted EPDM[5] (wt %) | Adhesion to ABS initial/average (pli)[6] | Adhesion to Polycarbonate initial/average (pli) |
|---|---|---|---|---|---|---|---|
| 14 | 17   | 25.5 | 42.5 | —   | 15.0 | 0.9/1.3 | 2.2/2.3 |
| 15 | 16.3 | 24.5 | 40.8 | 4.0 | 14.4 | 1.3/1.7 | 1.6/2.0 |
| 16 | 15.7 | 23.5 | 39.2 | 7.8 | 13.8 | 2.5/2.9 | 3.1/2.9 |

[1]KRATON ® G1652 (Shell), a S-EB-S block copolymer with a molecular weight of about 50,000
[2]KRATON ® G1651 (Shell), a S-EB-S block copolymer with a molecular weight of about 181,000
[3]DRAKOL ® 34 (Pennzoil), a white mineral oil with a specific gravity of 0.864–0.878 at 51° C. and a viscosity of 370–420 SUS at 38° C.
[4]KRISTALEX ® 1120 (Hercules), a low molecular weight styrenic resin derived from α-methylstyrene
[5]ROYALTUF ® 372P20 (Uniroyal), a SAN-grafted EPDM with a melt index of 20 g/10 min. at 265° C., 21600 g load
[6]pli = pounds per linear inch As the amount of flow promoter increases, the flow of the thermoplastic elastomer increases (Compositions 14, 15, and 16 had melt flow indices of 0.12, 0.18, and 0.83 g/10 min. at 230/2.16 kg load, respectively). The flow improvement can be seen to improve the adhesion to the substrates.

While this invention has been described in detail for purposes of illustration, it is not construed as limited thereby but is intended to cover all changes and modifications within the spirit and scope thereof.

What is claimed is:

1. A thermoplastic elastomer composition comprising:
   32–65 weight percent of a hydrogenated elastomeric block copolymer having at least two resinous endblocks of polymerized monovinyl aromatic compound and an elastomeric midblock of polymerized conjugated diene;
   20–45 weight percent of a midblock plasticizer; and
   10–18 weight percent of an ethylene-propylene-diene monomer rubber grafted with styrene-acrylonitrile.

2. A composition according to claim 1 further comprising a stabilizer.

3. A composition according to claim 2 wherein said resinous endblocks comprise polymerized styrene and said elastomeric midblock comprises polymerized 1,3-butadiene hydrogenated to remove the aliphatic unsaturation, thus appearing as ethylene/butylene.

4. A composition according to claim 3 wherein
   said block copolymer has a molecular weight in the range of about 50,000 to about 500,000; and
   said plasticizer is an oil.

5. A composition according to claim 4 further comprising 3 to 10 weight percent low molecular weight styrenic resin having the characteristic of improving flow of the thermoplastic elastomer.

6. A composition according to claim 5 wherein said hydrogenated elastomeric block copolymer is a mixture of a first block copolymer and a second block copolymer.

7. A composition according to claim 4 wherein
   said block copolymer has a molecular weight of at least 175,000 and comprises 32–45 weight percent of said thermoplastic elastomer; and
   said plasticizer is an oil and comprises 35–45 weight percent of said thermoplastic elastomer.

8. A composition according to claim 7 further comprising 3 to 15 weight percent polypropylene.

9. A composition according to claim 8 wherein said polypropylene comprises 5 to 10 weight percent of said thermoplastic elastomer.

10. A composition according to claim 7 further comprising 3 to 10 weight percent low molecular weight styrenic resin having the characteristic of improving flow of the thermoplastic elastomer.

11. A thermoplastic elastomer composition comprising:
    32 to 65 weight percent of a hydrogenated elastomeric linear block copolymer having at least two resinous endblocks of polymerized monovinyl aromatic compound and an elastomeric midblock of polymerized conjugated diene, said block copolymer having a molecular weight of at least 50,000;
    20 to 45 weight percent white mineral oil;
    6 to 18 weight percent of a ethylene-propylene-diene monomer rubber grafted with styrene-acrylonitrile;
    0 to 10 weight percent polypropylene;
    3 to 10 weight percent low molecular weight styrenic resin; and
    a stabilizer.

12. A composition according to claim 11 wherein said hydrogenated elastomeric block copolymer is a mixture of a first linear block copolymer and a second linear block copolymer.

13. A process for improving adhesion of a thermoplastic elastomer to a polar matrix, said process comprising:
    mixing a hydrogenated elastomeric block copolymer having at least two resinous endblocks of polymerized monovinyl aromatic compound and an elastomeric midblock of polymerized conjugated diene with white mineral oil, thereby forming a first mixture;
    mixing an ethylene-propylene-diene monomer rubber grafted with styrene-acrylonitrile with said first mixture, thereby forming a second mixture;
    extruding said second mixture;
    forming a shape comprising a polar polymer; and
    molding said extrudate onto said polar polymer, thereby forming an overmolded polar polymer shape.

14. A process according to claim 13 wherein the polar polymer is selected from polycarbonate and acrylonitrile-butadiene-styrene.

15. A process according to claim 13 further comprising injecting and molding said extrudate onto a warm polar polymer shape.

16. A process according to claim 13 further comprising aging said overmolded polar polymer shape.

17. A process according to claim 13 wherein the second mixture is co-extruded with the polar polymer.

18. A process according to claim 13 wherein polypropylene and a low molecular weight styrenic resin are mixed with said first mixture along with said grafted monomer rubber.

19. A process according to claim 13 wherein said hydrogenated elastomeric block copolymer comprises a first block copolymer and a second block copolymer.

20. A thermoplastic elastomer made according to the process of claim 13 wherein said block copolymer comprises 32 to 65 weight percent of said thermoplastic elastomer, said mineral oil comprises 20 to 45 weight percent of said thermoplastic elastomer, and said grafted monomer comprises 6 to 18 weight percent of said thermoplastic elastomer.

21. A thermoplastic elastomer according to claim 20 wherein said block copolymer has a molecular weight of at least 50,000.

22. A thermoplastic elastomer according to claim 21 further comprising 0 to 15 weight percent polypropylene and 3 to 10 percent low molecular weight styrenic resin.

23. A thermoplastic elastomer according to claim 21 wherein said block copolymer comprises a first block copolymer and a second block copolymer.

24. A thermoplastic elastomer according to claim 23 further comprising 0 to 15 weight percent polypropylene and 3 to 10 percent low molecular weight styrenic resin.

* * * * *